US009759234B2

(12) United States Patent
Domercq et al.

(10) Patent No.: US 9,759,234 B2
(45) Date of Patent: Sep. 12, 2017

(54) AERODYNAMIC COUPLING BETWEEN TWO ANNULAR ROWS OF STATIONARY VANES IN A TURBINE ENGINE

(75) Inventors: Olivier Stephane Domercq, Brie Comte Robert (FR); Vincent Paul Gabriel Perrot, Maisons Alfort (FR); Hanna Reiss, Pontault-Combault (FR); Jean-Francois Rios, Nandy (FR)

(73) Assignee: SNECMA, Paris (FR)

( * ) Notice: Subject to any disclaimer, the term of this patent is extended or adjusted under 35 U.S.C. 154(b) by 1258 days.

(21) Appl. No.: 13/696,727

(22) PCT Filed: Jun. 17, 2011

(86) PCT No.: PCT/FR2011/051400
§ 371 (c)(1),
(2), (4) Date: Nov. 7, 2012

(87) PCT Pub. No.: WO2011/157971
PCT Pub. Date: Dec. 22, 2011

(65) Prior Publication Data
US 2013/0058776 A1    Mar. 7, 2013

(30) Foreign Application Priority Data

Jun. 18, 2010    (FR) ...................................... 10 54875

(51) Int. Cl.
*F01D 9/04*     (2006.01)
*F04D 29/66*    (2006.01)
(Continued)

(52) U.S. Cl.
CPC ........... *F04D 29/666* (2013.01); *F01D 5/142* (2013.01); *F01D 5/146* (2013.01); *F01D 9/041* (2013.01);
(Continued)

(58) Field of Classification Search
CPC ...... F04D 29/542; F04D 29/544; F04D 29/66; F04D 29/666; F04D 29/667; F01D 9/04;
(Continued)

(56) References Cited

U.S. PATENT DOCUMENTS 2,798,661 A    7/1957   Willenbrock, Jr. et al.
4,981,414 A *  1/1991   Sheets ..................... F01D 5/145
                                              415/149.1
(Continued)

FOREIGN PATENT DOCUMENTS

DE    195 25 699    1/1997
EP    1 077 310     2/2001
(Continued)

OTHER PUBLICATIONS

International Search Report Issued Oct. 25, 2011 in PCT/FR11/51400 Filed Jun. 17, 2011.

*Primary Examiner* — Ninh H Nguyen
(74) *Attorney, Agent, or Firm* — Oblon, McClelland, Maier & Neustadt, L.L.P.

(57) ABSTRACT

A turbine engine has at least two successive annular rows of stationary vanes, e.g. formed by the vanes of a nozzle and by an annular row of casing arms arranged downstream from the nozzle Each casing arm extends substantially in a radial plane passing between the trailing edges of two adjacent stationary vanes of the nozzle, and the pitch between these two stationary vanes is greater than the pitch between the other stationary vanes of the nozzle, in such a manner that the wakes formed at the trailing edges of these two stationary vanes pass respectively on either side of the corresponding casing arm.

5 Claims, 1 Drawing Sheet

(51) Int. Cl.
*F01D 5/14* (2006.01)
*F02C 7/20* (2006.01)
*F04D 29/54* (2006.01)

(52) U.S. Cl.
CPC .............. *F02C 7/20* (2013.01); *F04D 29/544* (2013.01); *F05D 2260/961* (2013.01); *Y02T 50/673* (2013.01)

(58) Field of Classification Search
CPC .......... F01D 9/041; F01D 5/142; F01D 5/146; F05D 2260/961
See application file for complete search history.

(56) References Cited

U.S. PATENT DOCUMENTS

| | | | |
|---|---|---|---|
| 5,984,631 A | 11/1999 | Tolgos | |
| 6,905,303 B2 * | 6/2005 | Liu | F01D 5/26 29/889.22 |

FOREIGN PATENT DOCUMENTS

| | | |
|---|---|---|
| FR | 982 027 | 6/1951 |
| GB | 2 405 184 | 2/2005 |

\* cited by examiner

AERODYNAMIC COUPLING BETWEEN TWO ANNULAR ROWS OF STATIONARY VANES IN A TURBINE ENGINE

BACKGROUND OF THE INVENTION

Field of the Invention

The present invention relates to a turbine engine such as an airplane turboprop or turbojet, which engine has at least two successive annular rows of stationary vanes, e.g. formed by the vanes of a nozzle stage arranged at the outlet from a compression stage and by an annular row of casing arms arranged downstream from the nozzle.

Description of the Related Art

In a turbine engine, the nozzle arranged at the outlet from a compressor has an annular row of stationary vanes that, in the prior art, are regularly distributed around the longitudinal axis of the turbine engine.

An annular row of casing arms is arranged downstream from the nozzle, where the casing arms serve to transmit forces between internal and external casings to which they are connected and they extend through the stream of gas flowing from the compressor.

In the prior art, the angular positions of the casing arms relative to the nozzle vanes are not optimized. The wakes formed at the trailing edges of the nozzle vanes interact with the casing arms and generate significant head losses, thereby decreasing the performance of the turbine engine. Furthermore, it is possible to observe pumping phenomena that are initiated at the nozzle.

In order to improve the performance of a turbine engine, it is known to implement aerodynamic coupling between two stator elements or two rotor elements. Application EP-A-2 071 127 in the name of the Applicant describes a method of designing a multistage turbine engine turbine that makes it possible to achieve aerodynamic coupling over all of the sets of rotor vanes or of stator vanes of the turbine.

BRIEF SUMMARY OF THE INVENTION

An object of the invention is to improve the performance of a turbine engine of the above-specified type by achieving aerodynamic coupling between the stationary vanes of the nozzle and the casing arms situated downstream, or more generally, between two successive annular rows of stationary vanes of the turbine engine.

To this end, the invention provides a turbine engine comprising at least first and second successive annular rows of stationary vanes, such as for example an annular row of stationary vanes of a nozzle stage and an annular row of casing arms arranged downstream from the nozzle, the turbine engine being characterized in that each vane of the second row extends in a radial plane lying between the trailing edges of two consecutive vanes of the first row, and in that the pitch between these two vanes of the first row is greater than the pitch between the other vanes of the first row.

According to the invention, the pitch of the stationary vanes of the first row has a value that is greater between the vanes that are situated on either side of the radial plane passing via the vanes of the second row and a value that is smaller between the vanes situated between those two radial planes, such that the wakes formed at the trailing edges of the vanes of the first row pass respectively on either side of the vanes of the second row, thereby limiting head losses and aerodynamic interactions between the two rows of vanes.

According to a characteristic of the invention, the pitch between the two vanes of the first row that lie on either side of the radial plane passing via a vane of a second row is equal to 360° (1+m/n)/N, $\underline{n}$ being the number of vanes of the second row, N being equal to 360°/P2, and P2 being the pitch between the vanes of the first row that lie between two radial planes passing via two consecutive vanes of the second row, the number of vanes of the first row being an integer multiple of the number $\underline{n}$ of vanes of the second row, and $\underline{m}$ being an integer less than (n−1) and greater than or equal to zero and such that N=kn+m, where $\underline{k}$ is an integer.

In an embodiment, the pitch between to vanes of the first row situated on either side of the radial plane passing via a vane of the second row is equal to about 1.5 times the pitch between the other vanes of the first row.

When the vanes of the first row are vanes of a nozzle stage and the vanes of the second row are formed by casing arms, the pitch between two vanes of the first row situated on either side of the radial plane passing via a vane of the second row is equal to about 5.4° and the pitch between the other vanes of the second row is equal to about 3.6°.

The radial plane passing via a vane of the second row may pass between the pressure side of a first vane and the suction side of a consecutive second vane of the first row. The circumferential distance between said plane and the pressure side of said first vane may be less than the circumferential distance between the plane and the suction side of said second vane.

BRIEF DESCRIPTION OF THE SEVERAL VIEWS OF THE DRAWINGS

The invention can be better understood and other details, characteristics, and advantages thereof appear more clearly on reading the following description made by way of non-limiting example and with reference to the accompanying drawings, in which.

DETAILED DESCRIPTION OF THE INVENTION

Figure 1:
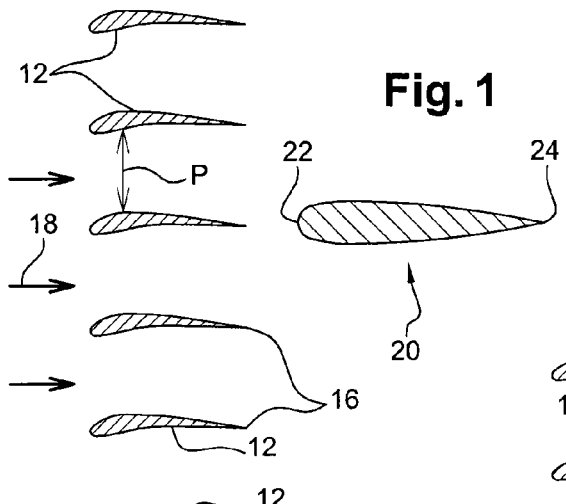
FIG. 1 is a highly diagrammatic fragmentary plan view of a nozzle and of a casing arm in a prior art turbine engine.

The description below relates to the situation in which the first row of stationary vanes is that of a nozzle stage 10 arranged at the outlet from a compression stage in a turbine engine such as an airplane turboprop or turbojet, and the second row of vanes is formed by an annular row of casing arms 20 arranged downstream from the nozzle.

The vanes 12 of the nozzle extend substantially radially through the stream of air flowing out from the compressor and they are attached to internal and/or external casings of the turbine engine by appropriate means.

The casing arms 20 located downstream from the nozzle 10, in particular at the outlet from the low pressure compressor, serve to connect the internal and external casings of the compressor together in order to transmit forces. Each of these casing arms 20 has an upstream leading edge 22 and a downstream trailing edge 24 for air coming from the nozzle 10.

The number of casing arms 20 is less than the number of stationary vanes 12 of the nozzle 10 and the casing arms are regularly distributed around the longitudinal axis of the turbine engine.

In the prior art, the stationary vanes 12 of the nozzle are regularly distributed around the longitudinal axis of the turbine engine. In other words, the circumferential pitch P of the vanes 12 is constant.

Furthermore, the angular positions of the casing arms 20 relative to the nozzle vanes 12 are random. That arrangement gives rise to significant head losses as a result of the interaction between the wakes formed at the trailing edges 16 of the vanes 12 with the casing arms 20, and also gives rise to risk of pumping being initiated in the nozzle.

The invention serves to remedy that problem by optimizing the number of nozzle vanes, the circumferential pitch between the nozzle vanes, and the angular positions of these vanes relative to the casing arms, enabling aerodynamic coupling to be achieved between the nozzle vanes and the casing arms.

Figure 2:
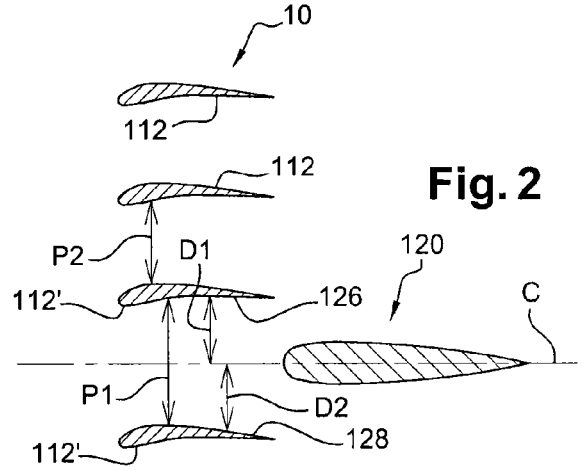
FIG. 2 is a highly diagrammatic fragmentary plan view of a nozzle and a casing arm in a turbine engine of the invention.
Figure 3:
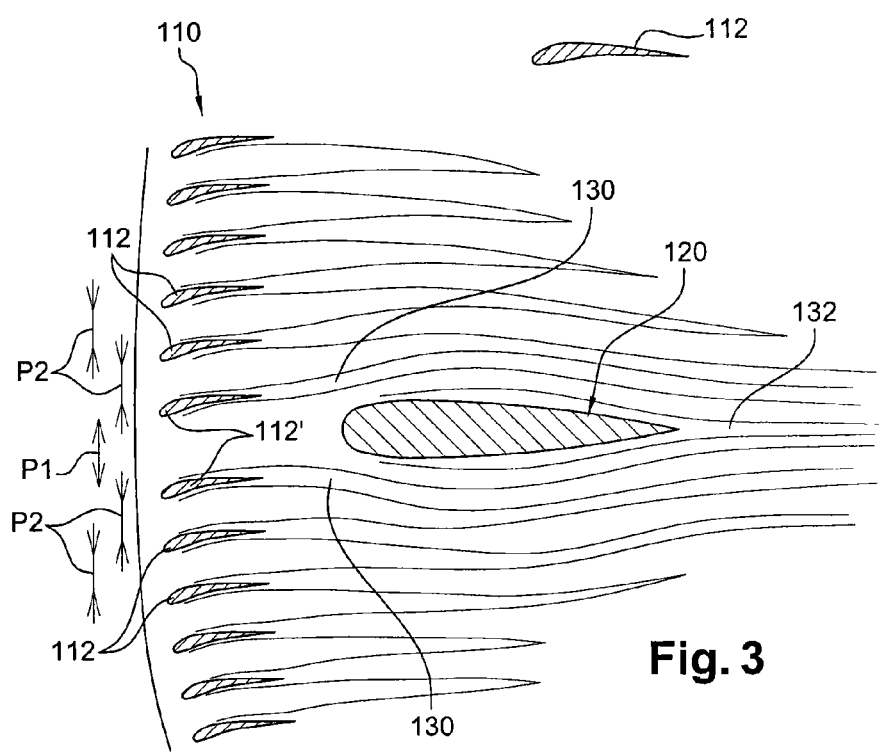
FIG. 3 is a view corresponding to FIG. 2 and showing the paths of the wakes formed at the trailing edges of the stationary vanes of the nozzle and of the casing arm.

As shown in FIGS. 2 and 3, each casing arm 120 extends in a radial plane C lying substantially between two consecutive vanes 112' of the nozzle 110. The casing arms 120 are angularly positioned relative to the vanes 112, 112' of the nozzle in such a manner that their radial planes C lie between pairs of consecutive vanes 112', and more particularly between the pressure side of one of the vanes 112' and the suction side of the other vane 112'. Advantageously, the circumferential direction D1 between the plane C and the suction side of the first vane 112' is less than the circumferential distance D2 between the plane C and the suction side of the other vane 112'.

The pitch P1 between the vanes 112' situated on either side of the plane C is greater in value than the pitch P2 between the other vanes 112 of the nozzle.

According to the invention, the pitch P1 may be defined by the following relationship:

$$P1 = 360°(1+m/n)/N$$

where:

$\underline{n}$ is the number of casing arms;

N is equal to $360°/P2$;

the number of nozzle vanes being an integer multiple of the number $\underline{n}$ of casing arms; and $\underline{m}$ is an integer less than (n−1) and greater than or equal to zero such that:

$$N = kn + m$$

where $\underline{k}$ is an integer.

The above relationship may also be written in the following form:

$$P1 = P2 + (360° - P2 \times N')/n$$

where N' is the number of nozzle vanes.

This relationship may be obtained by starting from a prior art example in which the nozzle has N stationary vanes distributed uniformly around the axis, at a pitch P2 equal to $360°/N$ between the vanes, the number of casing arms being $\underline{n}$. According to the invention, the pitch P2 is conserved between the nozzle vanes that are situated between the radial planes passing via the casing arms, and the pitch P1 between the vanes on either side of these radial planes are determined by the above relationship, the number N' of nozzle vanes now being an integer multiple of the number of casing arms.

The pitch P2 between the nozzle vanes in the invention is equal to the mean pitch P of the uniformly distributed nozzle vanes of the prior art in order to limit any risk of losing pumping margin when pumping is initiated at the nozzle.

By way of example, the pitch P1 between the vanes 112' is equal to approximately 1.5 times the pitch P2 between the other vanes 112. The pitch P1 may be equal to about 5.4° and the pitch P2 may be equal to about 3.6°, for example. The number of stationary vanes 112, 112' of the nozzle 110 may be equal to 96, for example, and the number of casing arms 120 may be equal to 8, for example.

As can be seen in FIG. 3, the wakes 130 formed downstream from the trailing edges of the vanes 112' of the nozzle 110 pass respectively on either side of the casing arms 120 and follow its profile without generating head loss, after which they flow on either side of the wake 132 formed by the trailing edge of the arm.

This limits interaction between the casing arms and the nozzle vanes situated upstream from these arms, reduces axially symmetrical disturbances at the nozzle, and limits the risks of loss of pumping margin at the nozzle.

The invention applies to all configurations in which two annular rows of stationary vanes are consecutive and downstream one from the other in a turbine engine.

The invention claimed is:

1. A turbine engine, comprising:
   at least first and second axially successive annular rows of stationary vanes,
   wherein each stationary vane of the second annular row extends in a radial plane lying between trailing edges of two consecutive stationary vanes of the first annular row, and
   wherein a pitch between said two consecutive stationary vanes of the first annular row located on either side of a radial plane passing through a stationary vane of the second annular row is equal to approximately about 1.5 times than a pitch between two consecutive stationary vanes of the first annular row located between two consecutive radial planes each passing through two consecutive stationary vanes of the second annular row.

2. The turbine engine according to claim 1, wherein the pitch between the two stationary vanes of the first annular row that are located on either side of the radial plane passing via a stationary vane of the second annular row is equal to $360°$ $(1+m/n)/N$, n being the number of stationary vanes of the second annular row, N being equal to $360°/P2$, and P2 being the pitch between the two consecutive stationary vanes of the first annular row located between two consecutive radial planes each passing through two consecutive stationary vanes of the second annular row, the number of stationary vanes of the first annular row being an integer multiple of the number of stationary vanes of the second annular row, and in being an integer less than (n−1) and greater than or equal to zero.

3. The turbine engine according to claim 1, wherein the pitch between said two consecutive stationary vanes of the first annular row located on either side of the radial plane passing through a stationary vane of the annular second row is equal to about 5.4° and the pitch between the two consecutive stationary vanes of the first annular row located between two consecutive radial planes each passing through two consecutive stationary vanes of the second annular row is equal to about 3.6°.

4. The turbine engine according to claim 1, wherein the radial plane passing via a stationary vane of the second annular row passes between a pressure side of a first vane and a suction side of a consecutive second vane of the first annular row, and a circumferential distance between said radial plane and the pressure side of said first vane is less than a circumferential distance between the radial plane and the suction side of said second vane.

5. The turbine engine according to claim 1, wherein said first and second successive annular rows of stationary vanes are respectively an annular row of stationary vanes of a nozzle stage and an annular row of casing arms arranged downstream from the nozzle.

* * * * *

UNITED STATES PATENT AND TRADEMARK OFFICE
CERTIFICATE OF CORRECTION

PATENT NO. : 9,759,234 B2
APPLICATION NO. : 13/696727
DATED : September 12, 2017
INVENTOR(S) : Olivier Stephane Domercq et al.

It is certified that error appears in the above-identified patent and that said Letters Patent is hereby corrected as shown below:

In the Claims

Column 4, Line 50, change "the number of stationary" to --the number n of stationary--; and Column 4, Line 51, change "and in being an integer" to --and m being an integer--.

Signed and Sealed this
Eleventh Day of June, 2019

Andrei Iancu
*Director of the United States Patent and Trademark Office*